US009523766B2

(12) United States Patent
Turbide

(10) Patent No.: US 9,523,766 B2
(45) Date of Patent: Dec. 20, 2016

(54) PHASE ERROR CORRECTION IN SYNTHETIC APERTURE IMAGING

(71) Applicant: INSTITUT NATIONAL D'OPTIQUE, Quebec (CA)

(72) Inventor: Simon Turbide, Quebec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 260 days.

(21) Appl. No.: 14/490,826

(22) Filed: Sep. 19, 2014

(65) Prior Publication Data

US 2016/0084946 A1  Mar. 24, 2016

(51) Int. Cl.
| | |
|---|---|
| *G01S 7/497* | (2006.01) |
| *G01S 17/89* | (2006.01) |
| *G01S 17/32* | (2006.01) |
| *G01S 7/481* | (2006.01) |
| *G01S 7/493* | (2006.01) |
| *G01S 7/491* | (2006.01) |

(52) U.S. Cl.
CPC ............... *G01S 7/497* (2013.01); *G01S 7/481* (2013.01); *G01S 7/493* (2013.01); *G01S 7/4917* (2013.01); *G01S 17/325* (2013.01); *G01S 17/895* (2013.01)

(58) Field of Classification Search
CPC ........... G01S 13/90; G01S 13/00; G01S 13/87
See application file for complete search history.

(56) References Cited

U.S. PATENT DOCUMENTS

| | | |
|---|---|---|
| 4,924,229 A | 5/1990 | Eichel et al. |
| 6,879,279 B2 | 4/2005 | Stappaerts |
| 7,345,744 B2 | 3/2008 | Halmos et al. |
| 7,474,332 B2 | 1/2009 | Byren |
| 8,629,975 B1 | 1/2014 | Dierking et al. |

OTHER PUBLICATIONS

Dale C. Griffith, Phase Error Compensation Technique for Improved Synthetic Aperture Radar Performance, 1997, Johns Hopkins APL Technical Digest, vol. 18, No. 3.*
Beck et al, Synthetic-aperture imaging laser radar: Laboratory demonstartion and signal processing, Optical Society of America, Applied Optics, vol. 44 No. 35 p. 7621-7626, Dec. 10, 2005.*

(Continued)

*Primary Examiner* — Luke Ratcliffe
(74) *Attorney, Agent, or Firm* — Merchant & Gould P.C.

(57) ABSTRACT

A method for phase error correction in a synthetic aperture (SA) imaging system is configured to image a target region of a scene from a platform in relative movement with respect to the scene. The method includes acquiring target SA data from the target region and reference SA data from a reference region of the scene, using a SA acquisition unit. One or more phase correction factors are determined from the reference SA data based on an assumption that the reference region has a known topography. The phase correction factors are representative of uncompensated optical-path-length fluctuations along the optical path between the reference region and the SA acquisition unit mounted on the platform. A phase correction is applied to the target SA data based on the phase correction factors so as to obtain phase-corrected target SA data. A SA imaging system implementing the method is also disclosed.

18 Claims, 13 Drawing Sheets

(56) References Cited

OTHER PUBLICATIONS

Bashkansky et al., Two-dimensional synthetic aperture imaging in the optical domain, Optical Society of America, Optics Letters, vol. 27 No. 22, p. 1983-1985, Nov. 15, 2002.
Beck et al., Synthetic-aperture imaging laser radar: laboratory demonstration and signal processing, Optical Society of America, Applied Optics, vol. 44 No. 35, p. 7621-7626, Dec. 10, 2005.
Krause et al., Synthetic Aperture Ladar Flight Demonstration, OSA/CLEO 2011.
Turbide et al., Investigation of Synthetic Aperture Ladar for Land Surveillance Applications, Proc. of SPIE, vol. 8897, p. 889707-1 to 8, 2013.
Eichel et al., Phase-gradiant algorithm as an optimal estimator of the phase derivative, Optical Society of America, Optics Letters, vol. 14 No. 20, p. 1101-1103, Oct. 15, 1989.

* cited by examiner

PHASE ERROR CORRECTION IN SYNTHETIC APERTURE IMAGING

TECHNICAL FIELD

The general technical field relates to synthetic aperture imaging and, in particular, to a method for correcting phase errors in a synthetic aperture imaging system.

BACKGROUND

Synthetic aperture (SA) imaging is a well-known imaging technology that can be used to increase resolution beyond the diffraction limit of a physical aperture of an imaging system. In SA imaging systems, a large "virtual" aperture is synthesized along a path by coherently summing the amplitude and phase information of return echoes from a plurality of electromagnetic signals sequentially transmitted by a relatively small physical aperture provided on a platform moving along the path. Typical implementations of SA imaging systems include a transmitter-receiver unit mounted on an airborne, spaceborne, or terrestrial platform (e.g., an aircraft, a satellite, a ground vehicle, a watercraft, and the like) traveling along a path over a target region to be imaged. The transmitter-receiver unit directs a plurality of electromagnetic signals onto the target region and collects a series of phase-coherent return echoes corresponding to the electromagnetic signals reflected by the target region. The return echoes can be recorded, and then coherently combined using signal processing techniques to reconstruct a high-resolution image of the target region. Typical implementations of SA imaging systems achieve two-dimensional imaging by using phase history reconstruction along the path (also referred to as the "azimuth" or "along-track" direction) and ranging with chirped signals at an angle (e.g., perpendicularly in zero-squint mode) to the path (also referred to as the "range" or "beam" direction).

SA imaging technology was initially developed and has been successfully employed at radio frequencies, where it is referred to as "synthetic aperture radar" (SAR) imaging. Conventional SAR systems typically operate in the centimeter (cm) wavelength range and produce images with azimuth resolutions of the order of a meter for spaceborne applications and of the order of a decimeter for airborne applications. As resolution is generally inversely proportional to the wavelength used for imaging, there has been a growing interest to extend SAR technology to shorter wavelengths. In particular, an emerging technology referred to as "synthetic aperture lidar" (SAL) imaging is currently being developed in order to apply SAR technology to the visible and near-infrared portions of the electromagnetic spectrum, with most reported experimental studies of SAL dating from the last decade. It is envisioned that SAL could produce images with azimuth resolutions of centimeters or less, and also provide information complementary to that provided by SAR systems.

In addition to its promising potential in terms of resolution, the development of SAL imaging also poses a number of challenges, among which is the measurement and correction of phase errors. As SA imaging relies on maintaining phase coherence between the return echoes collected over the length of the virtual aperture, any uncompensated fluctuations in the length of the optical path between the SA imaging system and the target region to be imaged can affect the phase of the return echoes and, in turn, lead to phase errors that can degrade the image reconstruction process. In particular, phase errors can result in images that are not uniformly focused across the target region. Typical sources of uncompensated optical-path-length fluctuations include, for example, unintended deviations in the platform motion and refractive-index inhomogeneities in the atmosphere. As obtaining high-quality SA images generally involves keeping phase errors to within a fraction of the imaging wavelength, which becomes increasingly difficult as the imaging wavelength decreases, phase errors are expected to be more important in SAL than in SAR.

One phase error correction method used in SAR systems employs global positioning system (GPS) data with an inertial navigation system (INS) to provide real-time compensation of undesired platform motions, in combination with autofocus techniques such as the phase gradient autofocus (PGA) algorithm. The PGA algorithm is a state-of-the-art technique for phase error correction that exploits the redundancy of phase error information among range bins by selecting and synthesizing the strongest scatterers (which may be in situ corner-cube retroreflectors) for each range bin. However, implementing an integrated INS/GPS system is generally complex and may not be sufficiently accurate for SAL requirements. Also, the PGA algorithm tends to be less efficient for large phase errors, and may therefore not be suitable for being used alone in SAL, due to the high level of blurring generally observed in uncorrected SAL images.

Accordingly, various challenges still exist in the field of phase error correction in SA imaging applications, particularly in SAL applications.

SUMMARY

According to an aspect of the invention, there is provided a method for phase error correction in a synthetic aperture (SA) imaging system configured for imaging a target region of a scene from a platform in relative movement with respect to the scene. The method includes the steps of:
a) acquiring target SA data from the target region and reference SA data from a reference region of the scene, using a SA acquisition unit provided on the platform;
b) determining one or more phase correction factors from the reference SA data based on an assumption that the reference region has a known topography, the one or more phase correction factors being representative of uncompensated optical-path-length fluctuations along a round-trip optical path between the reference region and the SA acquisition unit; and
c) applying a phase correction to the target SA data based on the one or more phase correction factors so as to obtain phase-corrected target SA data.

According to another aspect of the invention, there is provided a synthetic aperture (SA) imaging system for obtaining a phase error-corrected image of a target region of a scene from a platform in relative movement with respect to the scene. The SA imaging system includes:
  a SA acquisition unit provided on the platform and configured to acquire target SA data from the target region and reference SA data from a reference region of the scene; and
  a SA processing unit including:
    a determination module configured to determine one or more phase correction factors from the reference SA data based on an assumption that the reference region has a known topography, the one or more phase correction factors being representative of uncompensated optical-path-length fluctuations along a round-trip optical path between the reference region and the SA acquisition unit; and a correction module configured to apply a phase correction to the target SA data based on the one or more phase correction factors so as to obtain phase-corrected target SA data.

Other features and advantages of the embodiments of the present invention will be better understood upon reading of preferred embodiments thereof with reference to the appended drawings.

DETAILED DESCRIPTION

Figure 1:
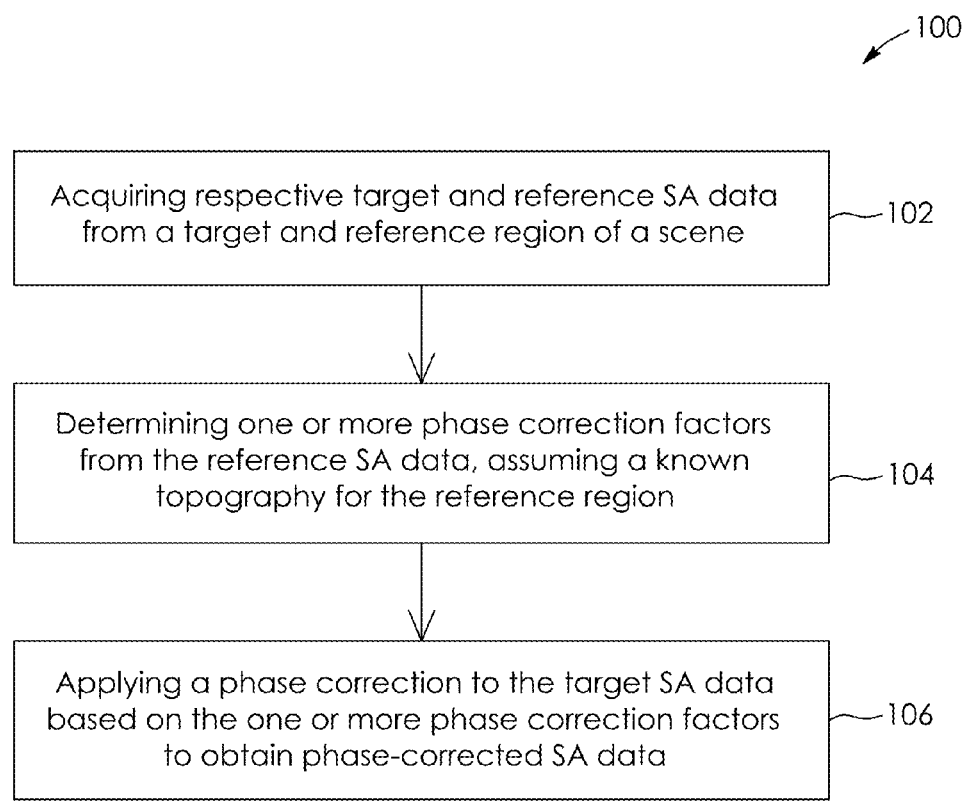
FIG. 1 is a flow chart of a method for phase error correction in a SA imaging system, in accordance with an embodiment.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.

General Overview of Phase Errors in Synthetic Aperture Imaging

The present description generally relates to a method for phase error correction in a synthetic aperture (SA) imaging system configured to image a target region of a scene from a platform in relative movement with respect to the scene. The present description also generally relates to a SA imaging system capable of implementing the method.

A conventional SA imaging system typically includes a transmitter that produces an electromagnetic signal which is directed toward a target region to be imaged, for example a ground surface of the Earth, while the SA imaging system is moving with respect to the target region. The electromagnetic signal is reflected by the target region, producing a return signal that is subsequently collected by a receiver of the SA imaging system. The range to the target region can be deduced from the amplitude of the return signal and the round-trip delay from transmission to reception. A processing unit can analyze data indicative of the return signal in order to reconstruct an image representative of the target region.

Basic SA processing generally assumes that the platform on which is mounted the SA imaging system follows a straight trajectory during the image formation time. In practice, however, wind, atmospheric turbulence and other environmental factors cause the platform to deviate from the assumed ideal trajectory, resulting in undesired range fluctuations during data acquisition. As the formation of a SA image is based on the coherent combination of the amplitude and phase information of a plurality of return signals received at different platform positions throughout the SA formation time, a range shift of $\Delta R$ between the platform and the target region leads to a corresponding round-trip phase shift of $\phi = 2 \times (2\pi \Delta R / \lambda)$ in the SA data. This phase shift, in turn, introduces errors in the phase history of the return signals. These phase errors can manifest themselves as image artifacts, a loss of resolution, and a reduction in the signal-to-noise ratio (SNR) that combine to blur or otherwise degrade the quality of the reconstructed images.

Thus, in order to form SA images of sufficiently high quality, it is desirable that deviations of the platform from the ideal trajectory (e.g., deviations in altitude, pitch, roll, yaw, and the like) be measured or calculated so that they can be corrected during the image reconstruction process. As SA images can be quite sensitive to platform deviations, it also desirable that phase errors be kept to within a fraction of the wavelength (e.g., about a tenth of a wavelength or less) for the duration of the SA formation time, which becomes increasingly stringent as the wavelength decreases. Accordingly, phase errors are expected to be more important in SAL than in SAR, as in SAL any instability in the platform motion of the order of a micrometer ($\mu$m) could lead to $2\pi$ phase errors.

It is also to be noted that phase errors in SA data can arise not only from deviations of the platform from its ideal trajectory, but also from any other sources of uncompensated fluctuations in the optical length of the round-trip optical path between the SA imaging system and the target region to be imaged. Other sources of phase errors can include, for example, atmospheric refractive-index inhomogeneities along the optical path between the SA imaging system and the target region.

Embodiments of the present invention may be particularly suitable for use in SAL applications employing wavelengths in the visible or near-infrared portions of the electromagnetic spectrum, where phase errors are expected to have a greater impact than in longer-wavelength SA imaging applications. Those skilled in the art will recognize, however, that the methods and systems described herein also apply to other types of SA imaging modalities, including, but not limited to, SAR imaging, SA terahertz imaging, SA infrared imaging, SA sonar (SAS) imaging, and SA ultrasound (SAU) imaging. It will also be understood that in the context of the present description, the terms "light" and "optical" are understood to refer to electromagnetic radiation in any appropriate portion of the electromagnetic spectrum. In particular, the terms "light" and "optical" are not limited to visible light, but can include, for example, the radio, microwave, terahertz, infrared, and visible wavelength ranges.

In this context, embodiments of the present invention provide a method for correcting phase errors in a SA imaging system configured to image a target region of a scene from a platform in relative movement with respect to the scene. FIG. 1 shows a flow chart of an embodiment of the method 100, which can, by way of example, be implemented in a SA imaging system 10 mounted on a moving platform 12 flying over a scene 14 along a flight trajectory 16, such as that illustrated in FIGS. 2 and 3. In particular, in FIGS. 2 and 3, the SA imaging system 10 is implemented in a typical side-looking stripmap operation mode, with the platform moving along the azimuth or along-track direction 18 and the SA imaging system 10 pointing perpendicular to the flight trajectory 16 (zero-squint mode) in the range or beam direction 20.

Of course, the phase error correction method 100 of FIG. 1 is also applicable to any other suitable SA imaging systems or operation modes (e.g., scanning or spotlight modes) capable of performing the appropriate method steps. Also, while the platform provided with the SA imaging system is an airplane in FIGS. 2 and 3, various other types of manned or unmanned airborne, spaceborne and terrestrial vehicles could be used in other embodiments. Furthermore, in FIGS. 2 and 3, the platform travels over a stationary scene, while in other embodiments it is the scene that moves past a stationary platform. In some embodiments both the platform and the scene may move. Those skilled in the art will appreciate that each of these scenarios is meant to be encompassed by the expression "platform in relative movement with respect to the scene".

Acquisition of Synthetic Aperture Imaging Data

Referring to FIG. 1, the method first includes a step 102 of acquiring SA data from two regions of the scene, namely a target region and a reference region. The SA data associated with the target and reference regions are respectively referred to as target and reference SA data, and are acquired using a SA acquisition unit. More regarding the operational and structural features of the SA acquisition unit will be described in greater detail below, with reference to FIG. 4.

Figure 2:
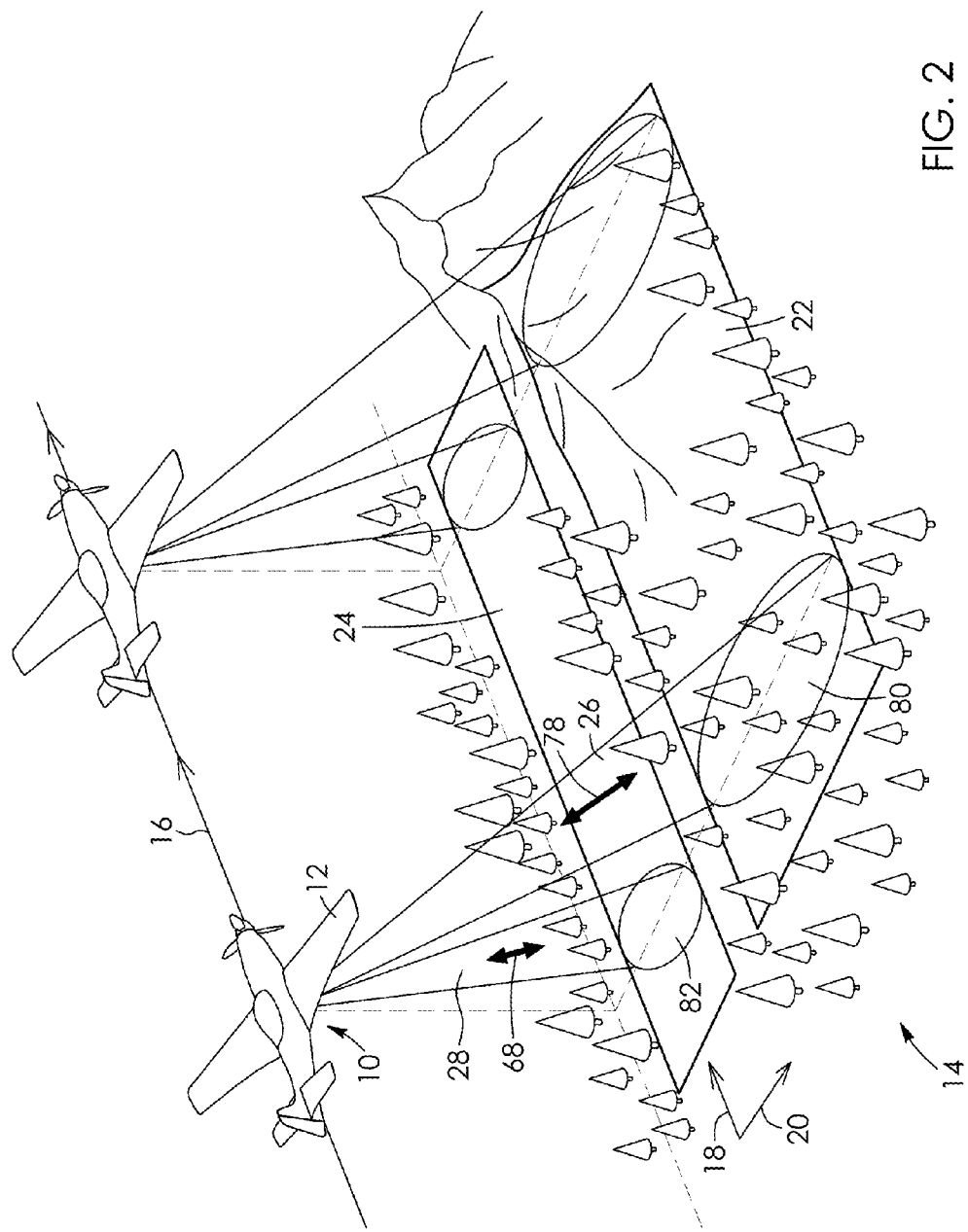
FIG. 2 is a schematic perspective view of a SA imaging system mounted on a platform moving relative to a scene along a flight trajectory, in accordance with an embodiment.

Turning to FIG. 2, first, the target region 22 corresponds to an area, object or feature of interest of the scene 14, whose image is to be obtained through appropriate processing of the target SA data, as in conventional SA imaging applications. Second, the reference region 24 corresponds to a region of the scene 14 having a topography which is assumed to be known, and preferably substantially uniform, over the extent of the reference region 24.

In the present specification, the term "topography" generally refers to the overall relief and surface elevation of the reference region. It will be understood that the term "known" when referring to the topography of the reference region is to be used as a practical term depending on the specific implementation of the phase error correction method. In particular, the term "known topography" generally refers to the fact that the topography of the reference region is known, or uniform, to a degree sufficient to justifiably assume that its effect on unexpected phase shifts in the reference SA data is known, or negligible, as will described in greater detail below. In some embodiments, it may also be advantageous that the reflectance characteristics (e.g., reflection coefficient and reflection type) of the reference region be known.

Depending on the implementation of the method, the reference region 24 may or may not overlap the target region 22. The reference region 24 is also generally smaller than the target region 22, as there is typically a practical size limit above which a reference region 24 of the scene 14 having a uniform, or at least known, topography can no longer be defined. As described below, the reference SA data from the reference region 24 can be processed to determine phase correction factors, which can then be applied to the target SA data to reduce phase errors and improve the quality of the reconstructed image of the target region. More regarding the reasons for and advantages of acquiring SA data from such a reference region 24 in view of correcting phase errors in the SA data from the target region 22 will become apparent from the description provided below.

Referring still to FIG. 2, the acquisition of the SA data from the target region 22 can involve illuminating the target region 22 with a target optical signal 26, and collecting return echoes produced by reflection of the target optical signal 26 from the target region 22. The area of the scene 14 which is illuminated by the target optical signal 26 at a given time, corresponding to a given position of the platform 12 along the flight trajectory 16, is referred to as the footprint 80 of the target optical signal 26. As the platform 12 travels along the flight trajectory 16, the footprint 80 of the target optical signal 26 is also moving, thereby defining the target region 22 of the scene 14. Similarly, the acquisition of the SA data from the reference region 24 can involve illuminating the reference region 24 with a reference optical signal 28, and collecting return echoes produced by reflection of the reference optical signal 28 from the reference region 24. The area of the scene 14 which is illuminated by the reference optical signal 28 at a given time is referred to as the footprint 82 of the reference optical signal 28. As the platform 12 travels along the flight trajectory 16, the footprint 82 of the reference optical signal 28 is also moving, thereby defining the reference region 24 of the scene 14. It will be understood that while the footprints 80, 82 of the target and reference optical signals 26, 28 are ellipses in FIG. 2, they may assume other shapes in other embodiments.

As the general principles underlying the acquisition of SA data of a target region of a scene from a platform traveling over the scene along a flight trajectory are well-known to those skilled in the art, they need not be covered in detail herein.

Figure 4:
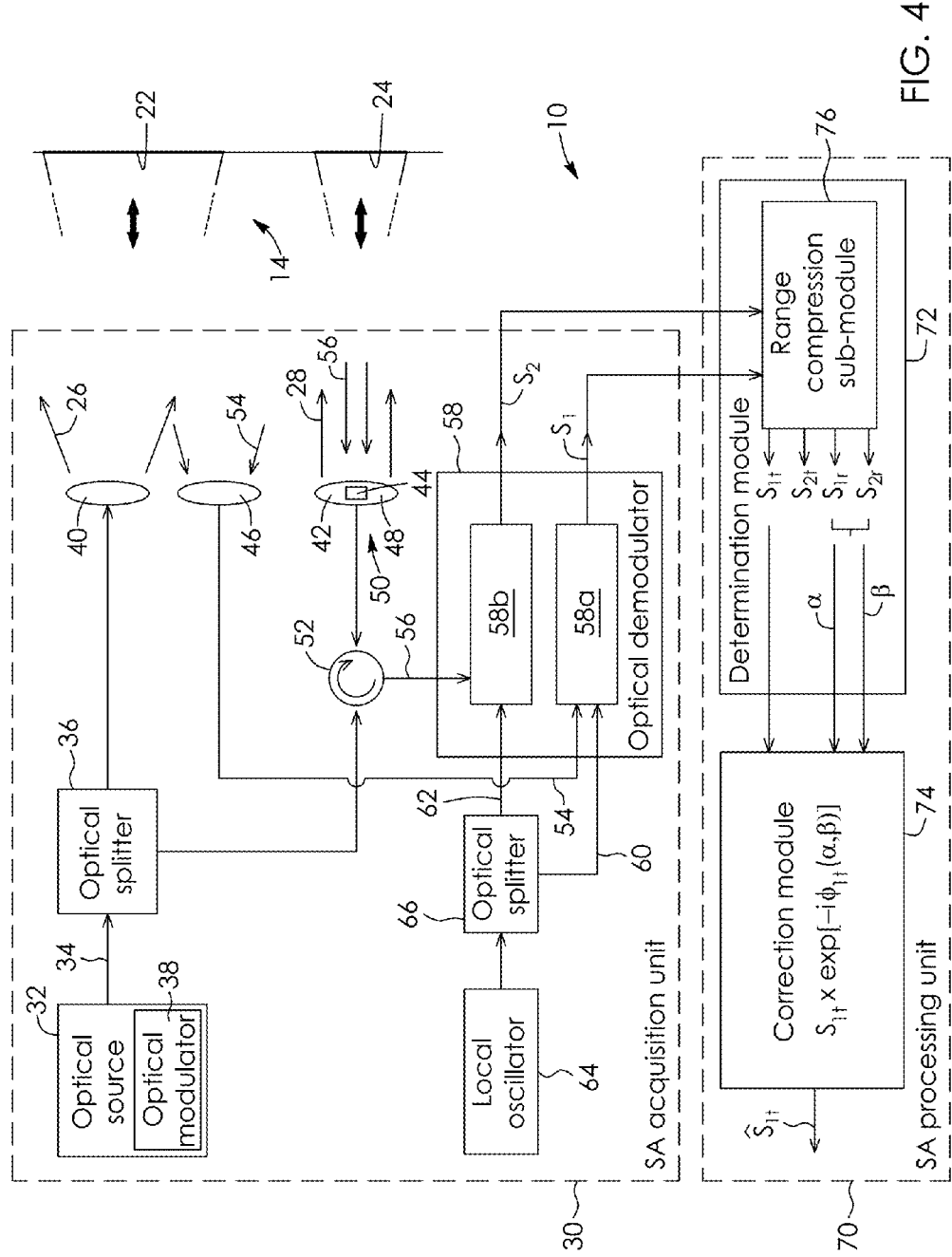
FIG. 4 is a simplified block diagram of the SA imaging system of FIG. 2.

Turning now to FIG. 4, there is provided a simplified block diagram of an embodiment of a SA acquisition unit 30 configured to acquire the target and reference SA data from the target and reference regions, respectively. In the illustrated embodiment, the SA acquisition unit 30 is configured for SAL applications in the near-infrared, but could be readily adapted for SA imaging in other wavelength ranges without departing from the scope of the present invention. For example, in other embodiments, the target and reference signals each has a wavelength from a few hundreds of nanometers to a few decimeters. For example, wavelengths ranging from a few centimeters to a few decimeters may be employed for SAR applications, while wavelengths ranging from a few hundreds of nanometers to a few micrometers may be employed for SAL applications. In yet other embodiments, acoustic waves may be employed to form the synthetic aperture, such as in SAS imaging applications.

In FIG. 4, the SA acquisition unit 30 includes an optical source 32 for generating a source optical signal 34, and an optical splitter 36 for splitting the source optical signal 34 into the target optical signal 26 and the reference optical signal 28. The optical source 32 can be embodied by any appropriate device or combination of devices apt to generate a source optical signal 34 suitable for SA imaging. For SAL applications, the optical source 32 is generally a laser source, which may be operated in continuous wave or pulsed regime, and which may or may not be modulated. For example, in the illustrated embodiment, the optical source 32 is a pulsed fiber laser emitting at a wavelength of 1.55 µm and provided with an optical modulator 38 that performs a linear frequency modulation on the source optical signal 34, of increasing or decreasing frequency (up-chirp or down-chirp, respectively). Those skilled in the art will understand that various other types of optical sources can be used in other embodiments including, but not limited to, a gas laser, a solid-state laser, a diode laser, a dye laser, a fiber laser, and the like. The choice of the optical source can be dictated by several factors, notably the desired wavelength, peak power, coherence, pulse duration and repetition rate of the optical source signal.

The time-dependent electric field of each linear frequency-modulated (LFM) pulse of the source optical signal 34 may be written as:

$$E(t) = E_0 rect\left(\frac{t}{\tau}\right) \cos(2\pi f_0 t + \pi K t^2), \quad (1)$$

where $\tau$ is the pulse duration, $f_0$ is the center frequency of the pulse (which is equal to 193 THz at a wavelength of 1.55 μm), and K is the chirp rate. It will be understood that Equation (1) describes pulses with a rectangular temporal profile. For example, in SAL applications, the pulses each may have a pulse duration ranging from a few nanoseconds to a few microseconds.

The optical splitter 36, for example a fiber splitter, splits the source optical signal 34 into the target and reference optical signals 26, 28, each of which therefore also has an LFM phase-encoded waveform. As known in the art of SA imaging, the inclusion of an up-chirp (K>0) or a down chirp (K>0) can improve the detection accuracy since it allows achieving both the average transmitted power of a relatively long pulse and the range resolution of a relatively short pulse. In the illustrated embodiment, the optical splitter 36 is a 90/10 fiber splitter, whereby 90% and 10% of the power of the source optical signal 34 are used to form the target and reference optical signals 26, 28, respectively. Of course, it is envisioned that optical splitters with various power-dividing ratios may be used without departing from scope of the present invention.

It is to be noted that depending on the intended application, the target and reference optical signals 26, 28 may or may not be phase-coherently synchronized with each other. It will also be appreciated that while the target and reference optical signals 26, 28 are generated using the same optical source 32 in the embodiment of FIG. 4, other embodiments of the SA acquisition unit 30 can generate the target and reference optical signals 26, 28 using different optical sources, which may operate in the same or in different portions of the electromagnetic spectrum. Furthermore, while the SA acquisition unit 30 in FIG. 4 is fiber-based, its fiber components could be replaced by bulk components in other embodiments.

Referring still to FIG. 4, the SA acquisition unit 30 can include a target transmitter 40 for illuminating the target region 22 with the target optical signal 26, and a reference transmitter 42 for illuminating the reference region 24 with the reference optical signal 28. Each of the target and reference transmitters 40, 42 can include appropriate transmitting optics (e.g., lens, mirrors, optical fibers) configured to direct, focus and/or condition the target and reference optical signals 26, 28 in order to efficiently illuminate the target and reference regions 22, 24, as illustrated in FIGS. 2 and 3.

Figure 3:
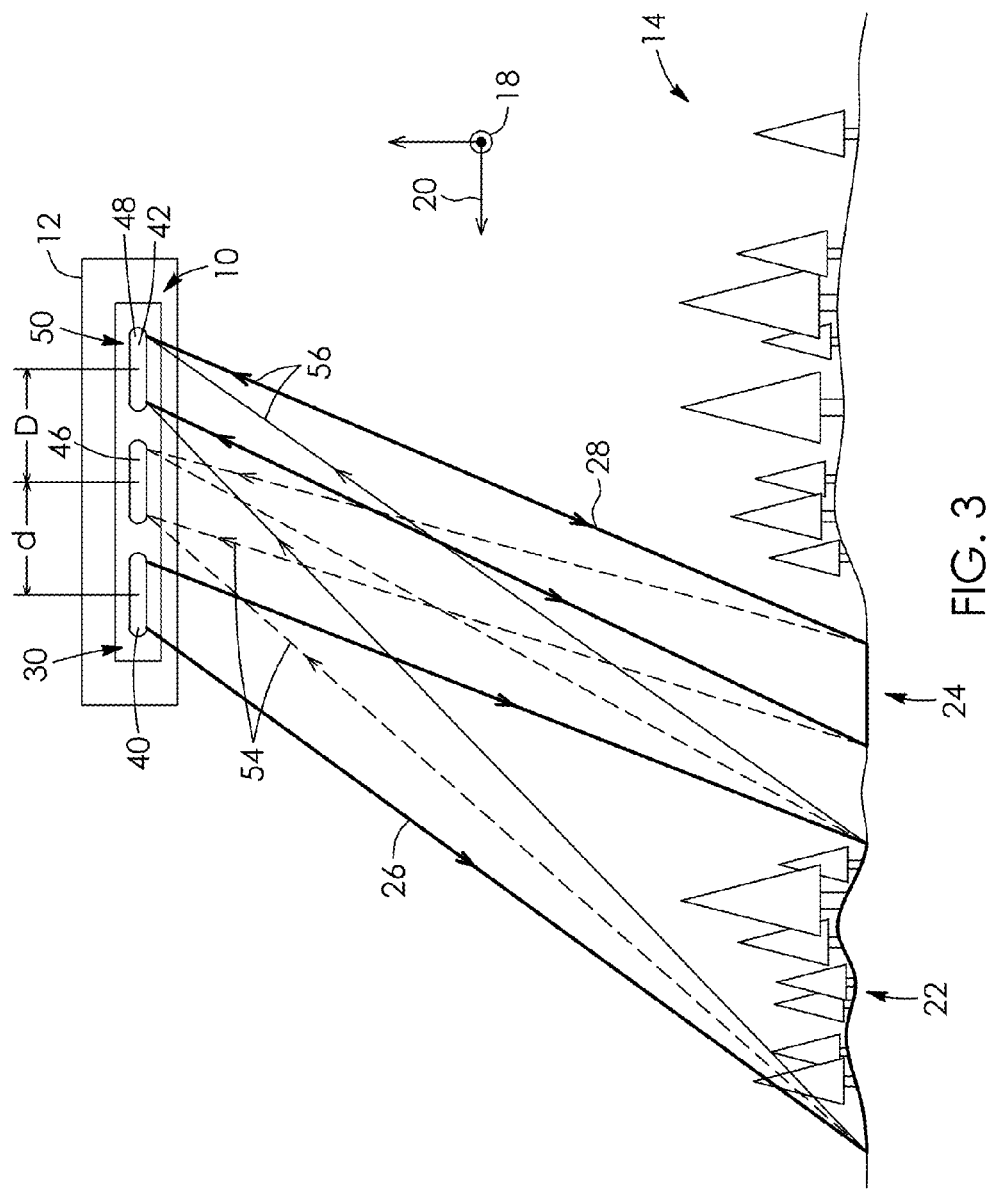
FIG. 3 is a schematic front elevation view of the SA imaging system of FIG. 2, illustrating the spatial arrangement of the components of the SA acquisition unit on the platform.

It is to be noted that, while in FIGS. 2 and 3 the target and reference transmitters 40, 42 are incident from the same side of the platform 12, due to the target and reference regions 22, 24 being located on the same side of the flight trajectory 16, the target and reference transmitters 40, 42 can be incident from opposite sides of the platform 12 in scenarios where the target and reference regions 22, 24 are located on corresponding opposite sides of the flight trajectory 16. Also, more than one reference optical signal may be used in some embodiments. More regarding possible alternative arrangements of the SA acquisition unit 30 on the platform 12 will be discussed further below, with reference to FIGS. 5A to 5C.

In the embodiment of FIG. 4, the reference transmitter 42 includes collimating optics 44 for collimating the reference optical signal 28 prior to directing the reference optical signal 28 onto the reference region 24. Then, as a result of collimation, the reference optical signal 28 can achieve low divergence and be focused at higher power density to have a relatively small footprint on the scene.

Those skilled in the art will understand that by converting the reference optical signal 28 into a collimated beam having a relatively small footprint on the ground, the condition of having a known, and preferably substantially uniform, topography over the extent of the reference region 24 can more easily be fulfilled, thereby facilitating the implementation of the phase error correction method described herein. It will also be understood that when the collimated reference optical signal 28 is incident onto the reference region 24 with a high power density, the reference SA data can exhibit a better SNR, which can make the determination of phase correction factors from the reference SA data easier. For example, in some embodiments, the power density of the reference optical signal 28 can be as much as ten times higher than the power density of the target optical signal 26. Additionally, when the reference optical signal 28 is collimated, only a modest portion of the source optical signal 34 may need to be extracted from the source optical signal 34. In this way, in some implementations, the generation of the reference optical signal 28 to acquire the reference SA data does not or only slightly impact the optical power budget compared to conventional SA imaging systems, while providing additional phase error correction capabilities, as described below.

Referring still to FIG. 4, the SA acquisition unit 30 can also include a first receiver 46 associated with the target transmitter 40, and a second receiver 48 associated with the reference transmitter 42. Each of the first and second receivers 46, 48 can include appropriate receiving optics (e.g., lens, mirrors, optical fibers) for collecting radiation from the scene 14.

Referring to FIG. 3, the first and second receivers 46, 48 are spaced from each other on the platform 12 by a distance D, which is along the range direction 20 in FIG. 3. Also, the target transmitter 40 and the first receiver 46 are two physically distinct components on the platform 12, separated by a distance d along the range direction, while the reference transmitter 42 and the second receiver 48 together form a collimated transceiver 50. Referring to FIG. 4, in such a configuration, an optical circulator 52 can be provided to separate signals coming in and out of the collimated transceiver 50. Of course, depending on the intended application, each transmitter-receiver pair of the SA acquisition unit 30 may be physically distinct components or be combined as a transceiver. In particular, the distance d would become zero if the target transmitter 40 and the first receiver 46 were to be combined into a single transceiver.

Referring to FIGS. 3 and 4, the first receiver 46 is configured to collect a first reflected signal 54 produced by reflection of the target and reference optical signals 26, 28 respectively from the target and reference regions 22, 24. Meanwhile, the second receiver 48 is configured to collect a second reflected signal 56 also produced by reflection of the target and reference optical signals 26, 28 respectively from the target and reference regions 22, 24. More specifically, the target optical signal 26 emitted by the target transmitter 40 is reflected by the target region 22, such that a portion of the reflected optical power is collected by the first receiver 46 and another portion is collected by the second receiver 48. Likewise, the reference optical signal 28 emitted by the reference transmitter 42 is reflected by the reference region 24, such that a portion of the reflected optical power is collected by the first receiver 46 and another portion is collected by the second receiver 48. Therefore, in the illustrated embodiment, each of the first and second reflected signals 54, 56 is a superposition of phase-coherent return echoes reflected by the target region 22 and phase-coherent return echoes reflected by the reference region 24.

It is to be noted that, in other embodiments, the number of receivers in the SA acquisition unit and the nature of the reflected signals collected by the receivers may be varied to suit a particular application, as will now be discussed with reference to FIGS. 5A to 5C, which illustrate alternative embodiments for the SA acquisition unit 30 of the SA imaging system 10.

Figure 5A:
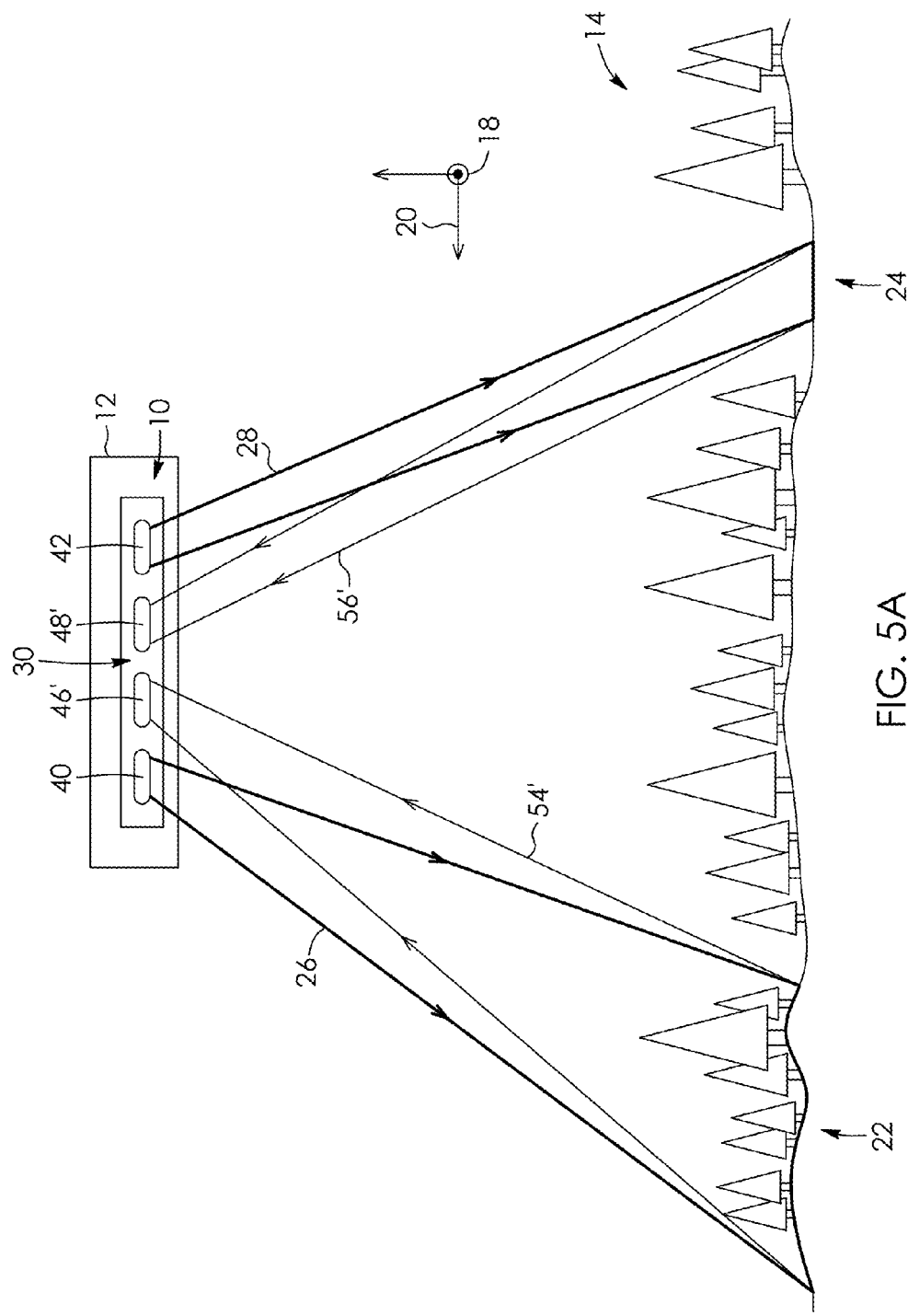
FIGS. 5A to 5C are schematic front elevation views of three embodiments of a SA imaging system, illustrating different implementations of the SA acquisition unit.

Referring to FIG. 5A, a first alternative configuration for the SA acquisition unit 30 is provided. In this configuration, the target and reference transmitters 40, 42 illuminate the scene 14 respectively with the target and reference optical signals 26, 28 from opposite sides of the platform 12, due to the target and reference regions 22, 24 being located on opposite sides of the flight trajectory 16. The SA acquisition unit 30 also includes a target receiver 46' configured to collect a target reflected signal 54' produced by reflection of the target optical signal 26 from the target region 22, and a reference receiver 48' configured to collect a reference reflected signal 56' produced by reflection of the reference optical signal 28 (which may or may not be collimated) from the reference region 24. It is to be noted that, in this configuration, each receiver 46', 48' collects a signal 54', 56' reflected from either the target region 22 or the reference region 24, but not from both. This can be achieved, for example, by proper orientation of the receivers 46', 48' and/or using an appropriate set of mirrors. It will also be recognized that, in this configuration, the target and reference SA data acquired by the SA acquisition unit 30 are not mixed with each other, thus avoiding the need to separate them in a subsequent processing step.

Figure 5B:
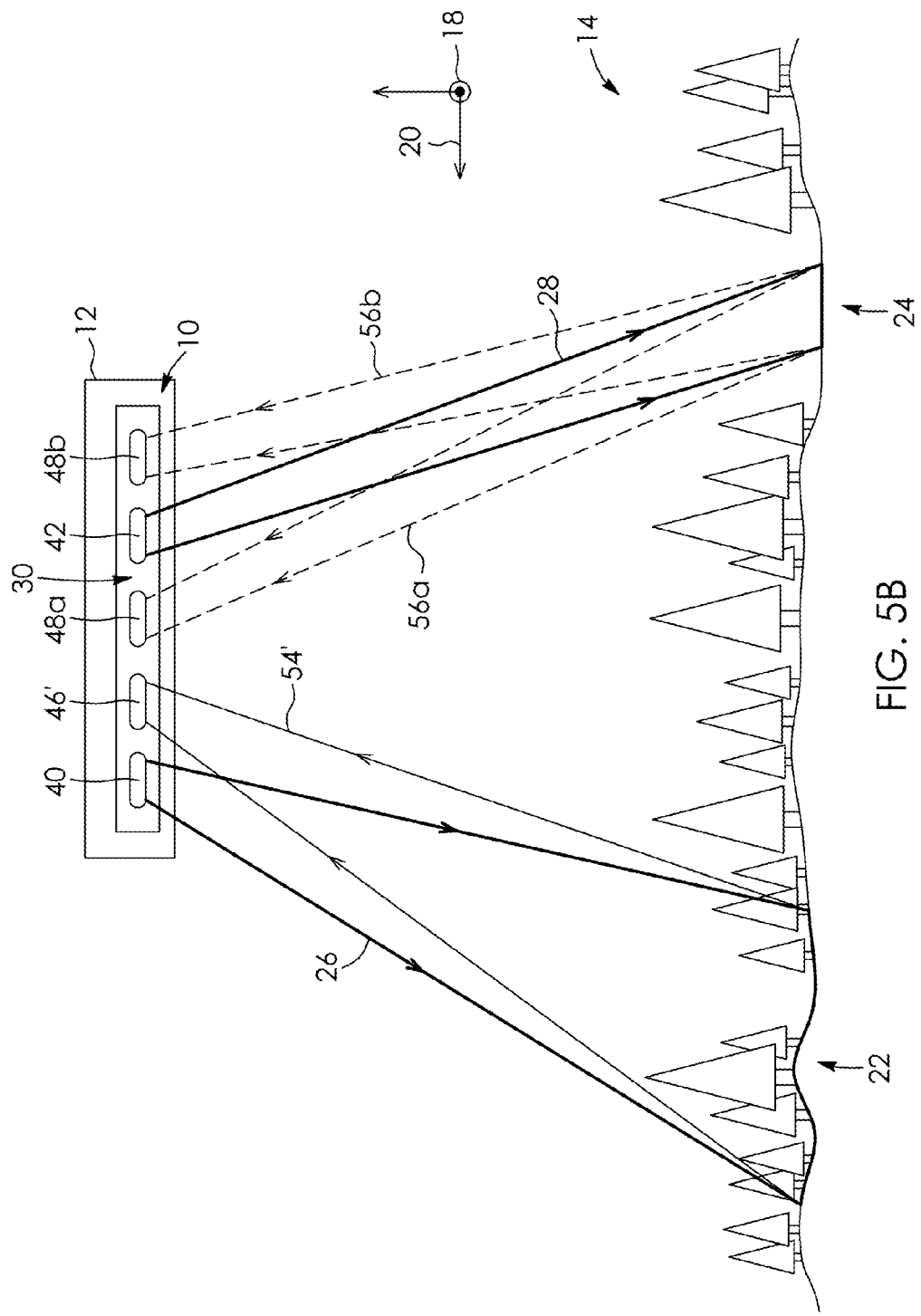

Turning now to FIG. 5B, a second alternative configuration for the SA acquisition unit 30 is illustrated. As in FIG. 5A, the target and reference transmitters 40, 42 also illuminate the scene 14 from opposite sides of the platform 12. The SA acquisition unit 30 includes a target receiver 46' configured to collect a target reflected signal 54' produced by reflection of the target optical signal 26 from the target region 22, and first and second reference receivers 48a, 48b configured to collect first and second reference reflected signals 56a, 56b produced by reflection of the reference optical signal 28 (which may or may not be collimated) from the reference region 24. Again, in this configuration, each receiver collects a signal reflected from either the target or the reference region, but not from both.

Figure 5C:
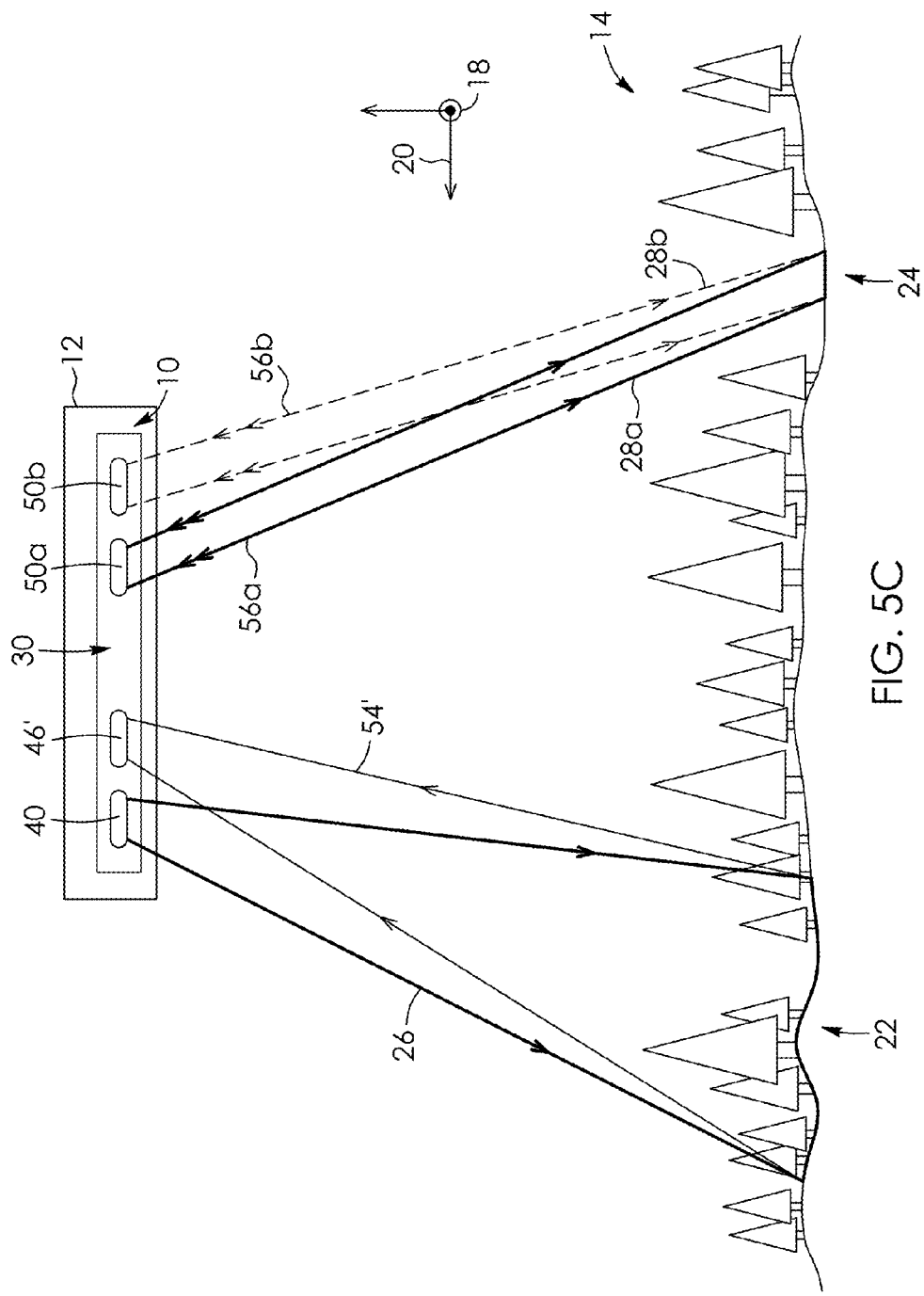

Finally, referring to FIG. 5C, a third alternative configuration for the SA acquisition unit 30 is illustrated. The SA acquisition unit 30 includes a target transmitter 40 illuminating the target region 22 from one side of the platform 12, and first and second spaced-apart reference transceivers 50a, 50b illuminating the reference region 24 from the other side of the platform 12 with respective first and second reference optical signals 28a, 28b, each of which may or may not be collimated. The first and second reference transceivers 50a, 50b are also configured to respectively collect a first and a second reference reflected signal 56a, 56b, each produced by reflection of the first and second reference optical signals 28a, 28b from the reference region 24. In other words, the first reference optical signal 28a emitted by the first reference transceiver 50a is reflected by the reference region 24, such that a portion of the reflected optical power is collected by the first reference transceiver 50a and another portion is collected by the second transceiver 50b. Likewise, the second reference optical signal 28b emitted by the second reference transceiver 50b is reflected by the reference region 24, such that a portion of the reflected optical power is collected by the first reference transceiver 50a and another portion is collected by the second transceiver 50b.

Referring back to FIG. 4, the SA acquisition unit 30 can further include an optical demodulator 58 configured to demodulate the first and second reflected signals 54, 56 and provide therefrom a first SA data set $S_1$ and a second SA data set $S_2$, respectively. As an example, the optical demodulator 58 can be an in-phase/quadrature (IQ) demodulator configured to perform a quadrature demodulation process on each of the first and second reflected signals 54, 56. In the illustrated embodiment, the optical demodulator 58 includes two demodulation sub-units 58a, 58b, each of which for demodulating one of the first and second reflected signals 54, 56. The quadrature demodulation process can be accomplished by mixing each of the first and second reflected signals 54, 56 with a local oscillator signal 60, 62 coherent with the source optical signal 34 or with a delayed version of the source optical signal 34. In FIG. 4, a local oscillator 64 (e.g., a fiber laser emitting at a wavelength of 1.55 μm) and an optical splitter 66 are used to generate the local oscillator signals 60, 62, but other configurations can be used in other embodiments. IQ demodulation processes are known to those skilled in the art and need not be further described. After demodulation, the first and second SA data sets $S_1$ and $S_2$ can be directed onto and detected by a light detector (not shown), which can convert the first and second SA data sets $S_1$ and $S_2$ into electrical signals. In some embodiments, the light detector is a PIN photodiode or an avalanche photodiode, but other types of light detector could be used in other embodiments. The electrical signals may then be digitally sampled at a frequency satisfying the Nyquist criterion, and digitally stored for later processing.

Figure 6:
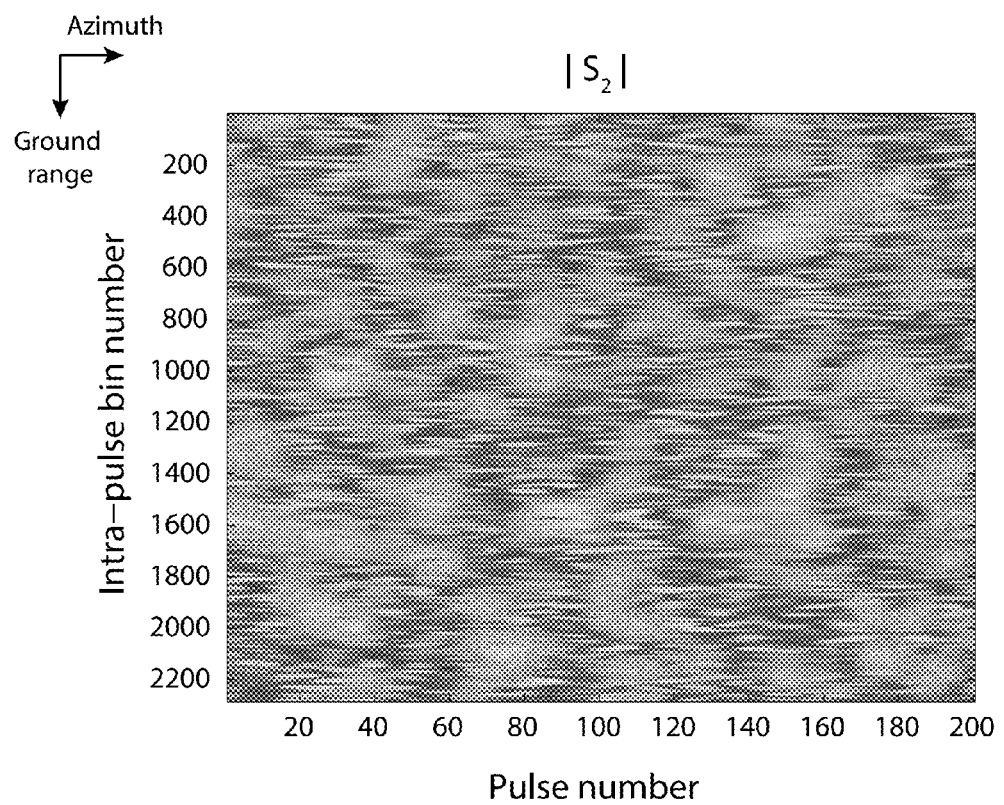
FIG. 6 is a plot of simulated SA raw data obtained after demodulation of the reflected signal collected by the second receiver in the simplified block diagram of FIG. 4.

The first SA data set $S_1$ and the second SA data set $S_2$ respectively obtained from the first and second reflected signals 54, 56 can be referred to as "SA raw data". Each of $S_1$ and $S_2$ can be represented as a two-dimensional complex-valued array of data points organized in rows along the azimuth direction and in columns along the range direction, where each data point of the array is associated with an amplitude value and a phase value. FIG. 6 is a gray-scale-coded plot of simulated SA raw data corresponding to the absolute value of the second SA data set $S_2$ after demodulation. The first SA data set $S_1$ would lead to a similar plot. As can be seen from FIG. 6, at this stage, the SA raw data generally does not form an interpretable image, but rather has a noise-like appearance, due to the fact that the data points are spread out in azimuth and ground range and include information from both the target and reference regions of the scene.

Referring back to FIG. 4, the first SA data set $S_1$ is composed of two signals: a first target SA signal $S_{1t}$, which corresponds to the signal emitted by the target transmitter 40 and collected by the first receiver 46, and a first reference SA signal $S_{1r}$, which corresponds to the signal emitted by the reference transmitter 42 and collected by the first receiver 46. The second SA data set $S_2$ is also composed of two signals: a second target SA signal $S_{2t}$, which corresponds to the signal emitted by the target transmitter 40 and collected by the second receiver 48, and a second reference SA signal $S_{2r}$, which corresponds to the signal emitted by the reference transmitter 42 and collected by the second receiver 48. It is to be noted that the first and second target SA signals $S_{1t}$ and $S_{2t}$ together form the target SA data, while the first and second reference SA signals $S_{1r}$ and $S_{2r}$ together form the reference SA data.

The extraction of the first target and reference SA signals $S_{1t}$ and $S_{1r}$ from the stored first SA data set $S_1$ and of the second target and reference SA signals $S_{2t}$ and $S_{2r}$ from the stored second SA data set $S_2$ can be performed using various techniques and algorithms based on numerical processing, optronic processing, or a combination of numerical and optronic processing. For example, in some embodiments, a numerical extraction of $S_{1t}$ and $S_{1r}$ can involve performing a range compression on $S_1$, while a numerical extraction of $S_{2t}$ and $S_{2r}$ can involve performing a range compression on $S_2$. Range compression techniques to improve ground range resolution and SNR are well-known in the art, and can be done efficiently in the frequency domain by using fast Fourier transform (FFT) techniques. For example, in SAL applications, range compression can involve performing a FFT on each column of $S_1$ and $S_2$, while in SAR applications, range compression can involve successively performing a FFT, applying a matched filter, and performing an inverse FFT on each column of $S_1$ and $S_2$.

Figure 7:
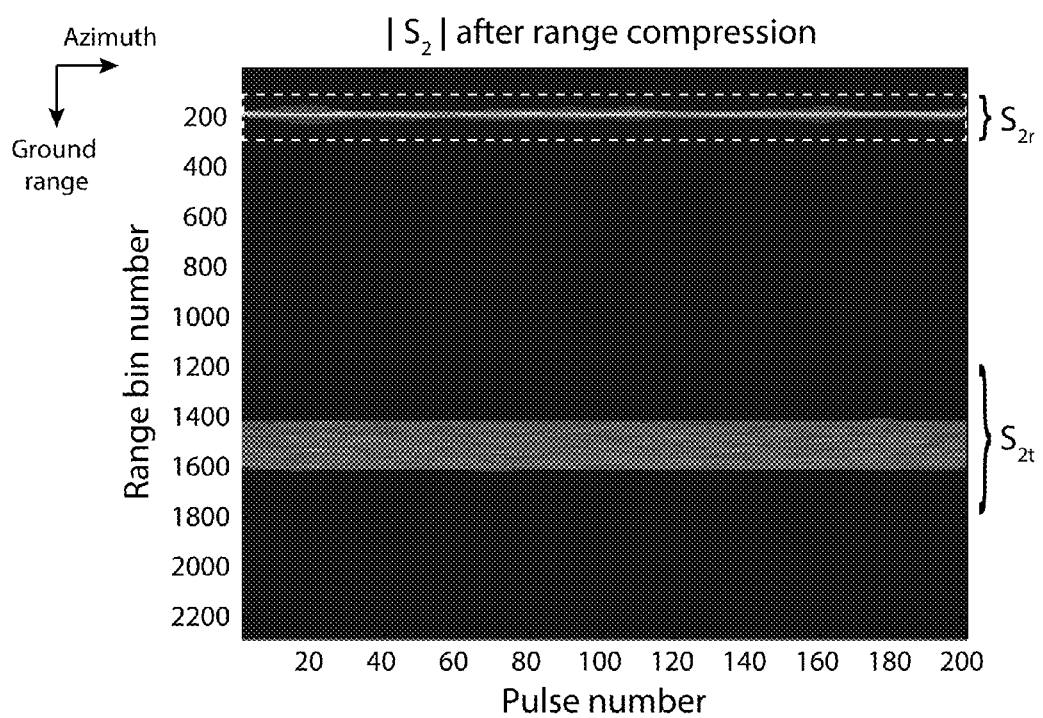
FIG. 7 is a plot of the simulated SA raw data of FIG. 6, after range compression.
Figure 7A:
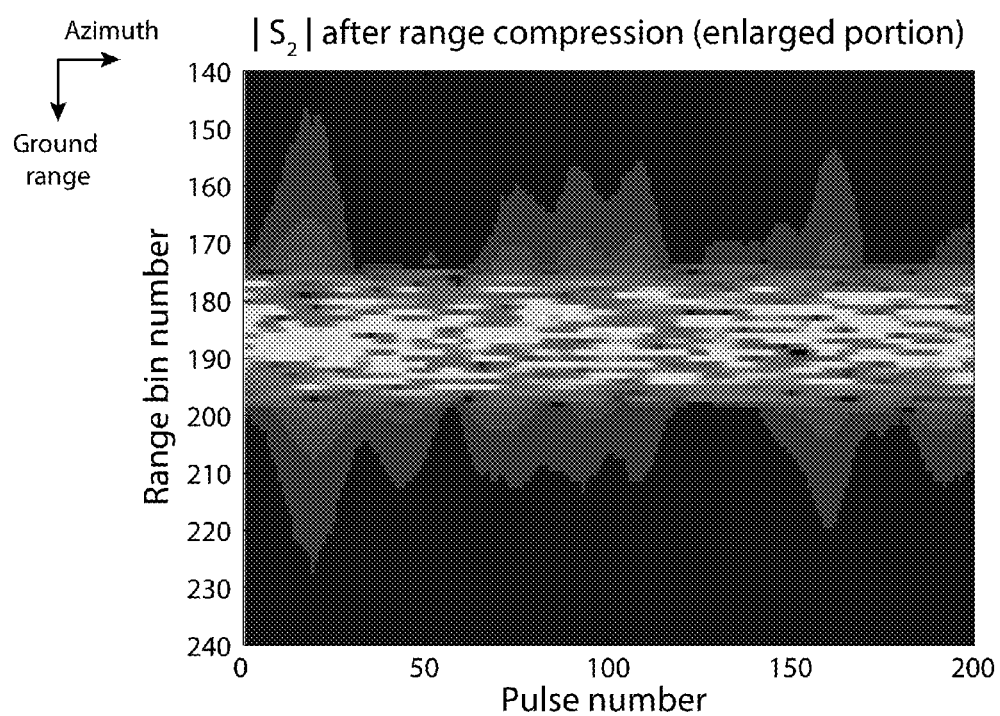
FIG. 7A is an enlargement of a portion of FIG. 7, delineated by dashed lines in FIG. 7, to better illustrate the reference SA signal received from the reference region.

After range compression, the data points in the two-dimensional arrays $S_1$ and $S_2$ can be associated with a position in ground range. Accordingly, the signals $S_{1t}$ and $S_{1r}$ can become easier to identify in the range-compressed data set $S_1$, and the signals $S_{2t}$ and $S_{2r}$ can become more easily recognizable in the range-compressed data set $S_2$. To better illustrate this effect, reference is made to FIG. 7, which is a plot of the second SA data set $S_2$ of FIG. 6 after range compression, as well as to FIG. 7A, which is an enlargement of the portion of FIG. 7 that better illustrates the signal $S_{2r}$ received from the reference region. Looking at FIG. 7, it is seen that the range signals $S_{2t}$ and $S_{2r}$ can now be distinguished, in particular $S_{2r}$ which, as seen in FIG. 7A, is characterized by a high amplitude response resulting from the collimation and associated high power density of the reference optical signal. In some embodiments, an optical delay may be introduced between the target and reference optical signals to further facilitate the identification of $S_{1t}$ and $S_{1r}$ from $S_1$ and the identification of $S_{2t}$ and $S_{2r}$ from $S_2$.

Those skilled in the art will recognize that in conventional SA imaging systems, only the complex demodulated signal $S_{1t}$ is obtained from the series of phase-coherent return echoes produced by reflection of the target optical signal from the target region. As will be now described, in some embodiments of the method described herein, once the first and second reference SA signals $S_{1r}$ and $S_{2r}$ have been extracted, calculated or otherwise obtained, they can be used in the method described herein to correct phase errors in the first target SA signal $S_{1t}$.

Determination of Phase Correction Factors

Referring back to FIG. 1, the phase error correction method 100 also includes a step 104 of determining one or more phase correction factors from the reference SA data based on the assumption, introduced above, that the reference region has known, and preferably substantially uniform, topographic characteristics over its extent.

Referring to FIG. 2, it will be recognized that when the topography of the reference region 24 is assumed to be known, the phase of each of the return echoes reflected by the reference region also has a known expected value when no phase error is present. Accordingly, any unexpected phase shift observed in the reference SA data can be interpreted as phase errors arising from uncompensated optical-path-length fluctuations along a round-trip optical path 68 between the reference region 24 and the SA acquisition unit 30 as the platform 12 travels along the flight trajectory 16. The uncompensated optical-path-length fluctuations can be indicative of at least one of unintended platform motions and refractive-index inhomogeneities along the round-trip optical path 68 between the reference region 24 and the SA acquisition unit 30.

Therefore, by acquiring SA data from such a reference region 24, the method 100 can allow for the determination of one or more phase correction factors which are representative of these uncompensated optical-path-length fluctuations such as, for example, undesired platform motions and atmospheric refractive-index inhomogeneities.

It is to be noted that once the reference region is assumed to have known topographic characteristics, various analysis, computational and processing techniques may be employed to derive phase correction factors to apply a phase correction to the target SA data. In the following, an exemplary, non-limiting approach for obtaining phase correction factors from the reference SA data will be described. The approach is based on the SA acquisition unit 30 described above with reference to FIGS. 3 and 4 and including a target transmitter 40, a first receiver associated with and separated by a distance d from the target transmitter 40, and a collimated transceiver 50 separated by a distance D from the first receiver 46 and including a reference transmitter 42 and a second receiver 48. The approach described below also assumes that the reference region 24 has a uniform topography. Of course, in other embodiments, phase correction factors could be determined from the reference SA data using a different approach without departing from the scope of the present invention.

First, when the source optical signal is given by Equation (1), and after range compression, the first target and reference SA signals $S_{1t}$ and $S_{1r}$ and the second target and reference SA signal $S_{2t}$ and $S_{2r}$ introduced above may be approximated as follows:

$$S_{1t}(t,x) \approx \sum_l A_l e^{-\frac{i2\pi f_0 [H_l(x)+G_l(x)]}{c}} W(x_l, y_l, x)\mathrm{sinc}\left(K\tau\left[t - \frac{H_l(x)+G_l(x)}{c}\right]\right), \quad (2a)$$

$$S_{1r}(t,x) \approx \sum_l A_l e^{-\frac{i2\pi f_0 [R_l(x)+H_l(x)]}{c}} w(x_l, y_l, x)\mathrm{sinc}\left(K\tau\left[t - \frac{R_l(x)+H_l(x)}{c}\right]\right), \quad (2b)$$

$$S_{2t}(t,x) \approx \sum_l B_l e^{-\frac{i2\pi f_0 [R_l(x)+G_l(x)]}{c}} W(x_l, y_l, x)\mathrm{sinc}\left(K\tau\left[t - \frac{R_l(x)+G_l(x)}{c}\right]\right), \quad (2c)$$

-continued $$S_{2r}(t, x) \approx \sum_l B_l e^{-\frac{i4\pi f_0 R_l(x)}{c}} w(x_l, y_l, x) \mathrm{sinc}\left(K\tau\left[t - \frac{2R_l(x)}{c}\right]\right). \quad (2d)$$

In Equations (2a) to (2d), t is the range time, x is the azimuth position of the platform 12, $(x_l, y_l)$ is the ground coordinates of a scatterer l within the scene 14, W is the irradiance of the target optical signal 26 on the ground, w is the irradiance of the collimated reference optical signal 28 on the ground, K is the chirp rate, $\tau$ is the pulse duration, $f_0$ is the center frequency, and c is the speed of light in vacuum. Also, the coefficients $A_l$ and $B_l$ represent the amplitude of the return signals collected by the first receiver 46 and the collimated transceiver 50, respectively, taking into account the collection efficiency, while the functions $H_l$, $G_l$ and $R_l$ correspond to the slant ranges from the scatterer l to the first receiver 46, the target transmitter 40 and the collimated transceiver 50, respectively.

The slant range functions $H_l$, $G_l$ and $R_l$ generally depend on the azimuth position x of the platform 12 along the flight trajectory 16. In the presence of phase errors caused by uncompensated optical-path-length fluctuations from transmission to reception, the slant range functions $H_l$, $G_l$ and $R_l$ may be approximated as follows:

$$R_l(x) \approx R_l + \alpha(x) - D\beta(x), \quad (3a)$$

$$G_l(x) \approx G_l + \frac{(x-x_l)^2}{2G_l} + \alpha(x) + d\beta(x), \quad (3b)$$

$$H_l(x) \approx H_l + \frac{(x-x_l)^2}{2H_l} + \alpha(x), \quad (3c)$$

where $\alpha$ is a first phase correction factor and $\beta$ is a second phase correction factor.

As will be described below, each of the first and second correction factors $\alpha$ and $\beta$ will be determined as a function of the first and second reference SA signals $S_{1r}(t, x)$ and $S_{2r}(t, x)$ given by Equations (2b) and (2d). The first phase correction factor $\alpha$ is associated with "common phase errors" arising from one or more sources of uncompensated optical-path-length fluctuations that are independent of the spatial arrangement of the reference transmitter 42, the first receiver 46 and the second receiver 48 on the platform 12, which is accounted for by the distances D and d in the present example. Meanwhile, the second phase correction factor $\beta$ is associated with "non-common phase errors" arising from one or more sources of uncompensated optical-path-length fluctuations that depend on the spatial arrangement the reference transmitter 42, the first receiver 46 and the second receiver 48 on the platform 12. In other words, the first phase correction factor $\alpha$ is meant to account for phase errors induced by uncompensated optical-path-length fluctuations that affect the SA signals identically, irrespective of their transmission and reception locations on the platform 12, while the second phase correction factor $\beta$ is meant to account for phase errors induced by uncompensated optical-path-length fluctuations that affect the SA signals differently based on their transmission and reception locations on the platform 12.

Common phase errors can include, for example, altitude fluctuations and lateral-position fluctuations, as well as local inhomogeneities in the refractive index of the atmosphere that are the same for all the signals transmitted and received by the SA imaging system. Meanwhile, non-common phase errors can arise as a result of uncompensated rotational motions of the platform such as, for example, roll fluctuations.

It is to be noted that because the reference optical signal 28 is collimated, the expression for the slant range function $R_l(x)$ in Equation (3a) does not possess the typical quadratic dependence as a function of azimuth position x exhibited by the slant range functions $G_l(x)$ and $H_l(x)$, which can simplify the calculation of the first and second correction factors $\alpha$ and $\beta$. However, the principles of the method described herein could also be applied to SA imaging system implementations where the reference optical signal 28 is not collimated.

Assuming that the uncompensated optical-path-length fluctuations remain relatively small compared to the ground range cell resolution, the range compressed first and second reference SA signals $S_{1r}(t, x)$ and $S_{2r}(t, x)$ may be written as:

$$S_{1r}(t, x) \approx e^{-\frac{i2\pi f_0 [2\alpha(x) - D\beta(x)]}{c}} \sum_l A_l e^{-\frac{i2\pi f_0 (R_l + H_l)}{c}} \quad (4a)$$

$$e^{-\frac{i\pi f_0 (x-x_l)^2}{c}\left(\frac{1}{H_l}\right)} \times w(x_l, y_l, x) \mathrm{sinc}\left(K\tau\left[t - \frac{(H_l + R_l)}{c}\right]\right),$$

$$S_{2r}(t, x) \approx \quad (4b)$$

$$e^{-\frac{i2\pi f_0 [2\alpha(x) - 2D\beta(x)]}{c}} \sum_l B_l e^{-\frac{i4\pi f_0 R_l}{c}} w(x_l, y_l, x) \mathrm{sinc}\left(K\tau\left[t - \frac{2R_l}{c}\right]\right),$$

where it can be seen that the first and second phase correction factors $\alpha$ and $\beta$ in the exponential function have been taken outside the summation.

It is to be noted that a range migration correction has been applied to Equations (4a) and (4b) to correct the effect of range migration, which, as known in the art, results from the variation of the slant range between the platform and the reference region during the SA formation time. Range migration correction allows correcting the ground range variation of the return echoes corresponding to each data point in the two-dimensional arrays $S_{1r}(t, x)$ and $S_{2r}(t, x)$. It is also to be noted that in a scenario where the uncompensated optical-path-length fluctuations would be larger than the ground range cell resolution, the first and second phase correction factors $\alpha$ and $\beta$ would initially remain in the sinc function, but would be taken out by applying a range migration correction under the assumption of a uniform reference region 24, thus recovering the expressions of Equations (4a) and (4b).

Under the assumption of a narrow collimated beam fulfilling the condition $$\frac{\pi f_0}{cH}\left(\frac{F}{2}\right)^2 < 2\pi$$

for the reference optical signal 28, the quadratic phase term can be ignored in $S_{1r}$ and $S_{2r}$ so that a particular range bin $t_i$ in Equations (4a) and (4b) may be written as:

$$S_{1r}(t_i, x) \approx e^{-\frac{i2\pi f_0 [2\alpha(x) - D\beta(x)]}{c}} |C'(x, t_i)| e^{i\phi_{C'}(x, t_i)}, \quad (5a)$$

$$S_{2r}(t_i, x) \approx e^{-\frac{i2\pi f_0 [2\alpha(x) - 2D\beta(x)]}{c}} |C(x, t_i)| e^{i\phi_C(x, t_i)}. \quad (5b)$$

It is to be noted that Equations (5a) and (5b) generally are valid over a limited interval of range bin values $t_i$, where the complex amplitude of $S_{1r}(t_i, x)$ and $S_{2r}(t_i, x)$ is sufficiently large. For example, in the range-compressed SA raw data of FIG. 7 the interval of range bin values t over which Equation (5b) for $S_{2r}(t_i, x)$ is valid would be expected to approximately coincide with the interval of range bin values ranging from about 175 to 200 and illustrated in FIG. 7A.

The x dependence of the complex functions C and C' is due to speckle, providing that the reference region has a relatively homogeneous topography at the operating wavelength. In this embodiment, the use of a collimated reference optical signal allows the quadratic phase term to be neglected in Equation (3a). This, in turn, leads to a smoother speckle pattern that can be markedly reduced after averaging over multiple range bins. As known in the art, speckle is a SA imaging specific noise effect resulting from constructive and destructive interference from multiple scatterers within a resolution cell of the SA imaging system that gives the SA images a grainy or textured appearance.

The method can then involve using a phase gradient method which, as known in the art, is a linear minimum-variance estimator for phase error that can efficiently combine measurements from a plurality of range bins. The method may first include taking the derivative of $S_{1r}(t_i, x)$ and $S_{2r}(t_i, x)$ with respect to the azimuth position x, as follows:

$$\frac{\partial S_{1r}(t_i, x)}{\partial x} = \frac{i2\pi}{N\Delta x} IFFT\{k \cdot FFT\{S_{1r}(t_i, x)\}\}, \tag{6a}$$

$$\frac{\partial S_{2r}(t_i, x)}{\partial x} = \frac{i2\pi}{N\Delta x} IFFT\{k \cdot FFT\{S_{2r}(t_i, x)\}\}, \tag{6b}$$

where IFFT denotes the inverse fast Fourier transform, $\Delta x$ is the displacement of the platform between the emission of two consecutive pulses by the reference transmitter 42, N is the number of pulses emitted and k=[0 1 ... N−1] is the spectral index vector. Using Equations (6a) and (6b), the derivative of the phase signal of $S_{1r}(t_i, x)$ and $S_{2r}(t_i, x)$ with respect to the azimuth position x may then be written as:

$$\frac{\partial \phi_{1r}(t_i, x)}{\partial x} = \frac{Im\left[\frac{\partial S_{1r}(t_i, x)}{\partial x} S_{1r}^*(t_i, x)\right]}{|S_{1r}(t_i, x)|^2}, \tag{7a}$$

$$\frac{\partial \phi_{2r}(t_i, x)}{\partial x} = \frac{Im\left[\frac{\partial S_{2r}(t_i, x)}{\partial x} S_{2r}^*(t_i, x)\right]}{|S_{2r}(t_i, x)|^2}, \tag{7b}$$

where Im and * respectively denote the imaginary part and the complex conjugate of a complex number.

Next, the method may involve averaging over multiple range bins, to reduce the speckle, and integrating the result over x, which yield:

$$\Phi_{1r} = \int dx \left\langle \frac{\partial \phi_{1r}(t_i, x)}{\partial x} \right\rangle \approx \frac{2\pi f_0[2\alpha(x) - D\beta(x)]}{c}, \tag{8a}$$

$$\Phi_{2r} = \int dx \left\langle \frac{\partial \phi_{2r}(t_i, x)}{\partial x} \right\rangle \approx \frac{2\pi f_0[2\alpha(x) - 2D\beta(x)]}{c}. \tag{8b}$$

Equations (8a) and (8b) provide a link between the phase of the first and second reference SA signals $S_{1r}$ and $S_{2r}$ and the uncompensated optical-path-length fluctuations along the round-trip optical paths (i.e., $R_f(x)+H_f(x)$ for $S_{1r}$ and $2R_f(x)$ for $S_{2r}$) between transmission and reception. The first and second phase correction factors $\alpha$ and $\beta$ can finally be extracted from Equations (8a) and (8b) and be written as:

$$\alpha(x) = \frac{c}{4\pi f_0}(2\Phi_{1r} - \Phi_{2r}), \tag{9a}$$

$$\beta(x) = \frac{c}{2\pi f_0 D}(\Phi_{1r} - \Phi_{2r}). \tag{9b}$$

As mentioned above, the phase correction factors $\alpha$ and $\beta$ represent phase errors resulting from common and non-common uncompensated optical-path-length fluctuations, respectively. It will be understood that the determination of two phase correction factors $\alpha$ and $\beta$ is made possible by the fact that two reflected signals from the reflection regions are measured at two different locations on the platform. This is the case for the SA acquisition unit 30 illustrated in FIG. 4, but also for the alternative configurations of FIGS. 5B and 5C. However, for the SA acquisition unit 30 illustrated in FIG. 5A, only one reflected signal is measured from the reference region so that only one phase correction factor would generally be obtained using the exemplary approach described above with reference to Equations (2a) to (9b). This single phase correction factor would account for both common and non-common phase errors at the same time, but would not be able to directly isolate their individual contributions.

Correction of Phase Errors

Referring back to FIG. 1, the method 100 further includes a step 106 of applying a phase correction to the target SA data based on the one or more phase correction factors so as to obtain phase-corrected target SA data. In the exemplary approach described above with reference to Equations (2a) to (9b), the correction step 106 can include applying a phase correction to the first target SA signal $S_{1t}(t, x)$ based on the first and second phase correction factors $\alpha$ and $\beta$. Indeed, the first target SA signal $S_{1t}(t, x)$ corresponds to the signal emitted by the target transmitter and collected by the first receiver after reflection by the target region, which is the region of interest of the scene whose SA image is desired to be reconstructed, and thus corrected for phase errors.

Referring to FIG. 2 as well as to Equation (2a), a round-trip optical path 78 associated with the first target SA signal $S_{1t}(t, x)$ may be written as the sum of the slant ranges $G_f(x)$ and $H_f(x)$. Furthermore, in view of Equations (3a) and (3b), the uncompensated optical-path-length fluctuations in the round-trip optical path 78 result in a round-trip range shift of $\Delta R_{1t}=2\alpha(x)+d\beta(x)$ during data acquisition and, in turn, to a corresponding round-trip phase shift $\phi_{1t}$ in the first target SA signal $S_{1t}(t, x)$, which may be written as:

$$\phi_{1t} = -\frac{2\pi f_0}{c}[2\alpha(x) + d\beta(x)], \tag{10}$$

The phase shift $\phi_{1t}$ can introduce errors in the phase history of the first target SA signal $S_{1t}(t, x)$. In some embodiments of the method described herein, correcting phase errors in the first target SA signal $S_{1t}(t, x)$ can involve subjecting $S_{1t}(t, x)$ to an equal but opposite phase shift $-\phi_{1t}$ as follows:

$$\hat{S}_{1t}(t,x) \sim [S_{1t}(t,x)] \times e^{-i\phi_{1t}}, \tag{11}$$

where $\hat{S}_{1t}(t,x)$ is the phase-corrected first target SA signal. It is seen that, in this implementation of the method, the phase correction of the first target SA signal $S_{1t}(t, x)$ is applied based on the first and second phase correction factors α and β and in view of the relative spatial arrangement of the target transmitter and the first receiver on the platform, which is accounted for by their spacing d.

Figure 8A:
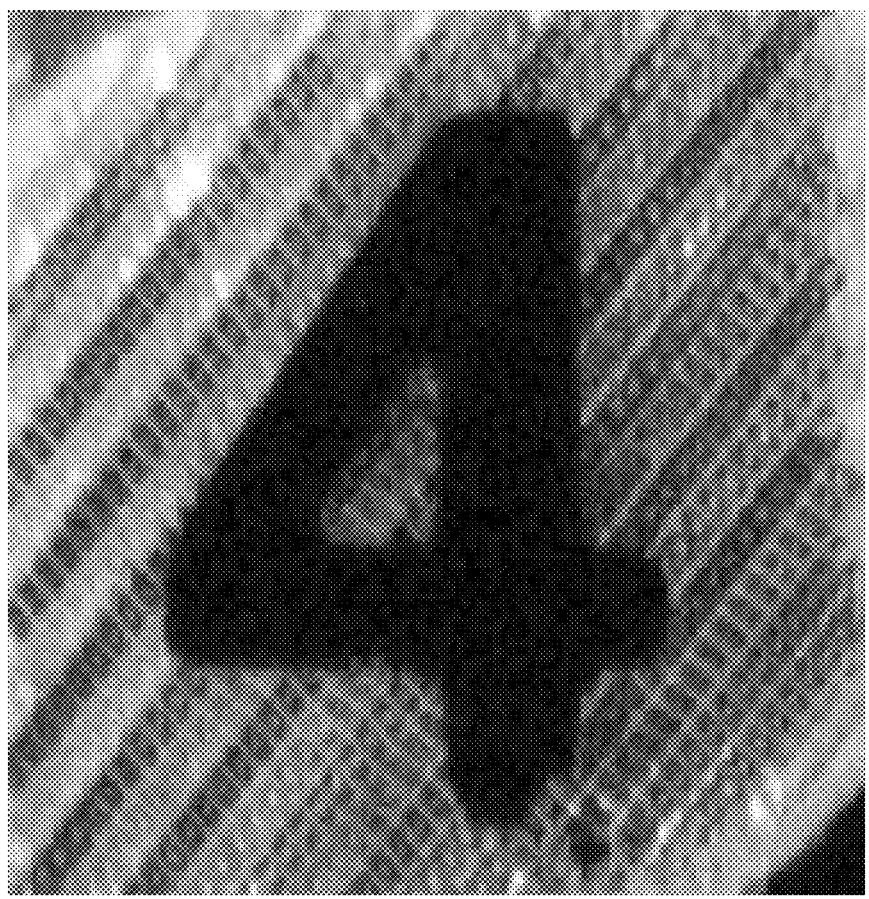
FIG. 8A is a photograph of a target used in a laboratory-scaled experiment conducted to illustrate the capabilities of the phase error correction method described herein.
Figure 8B:
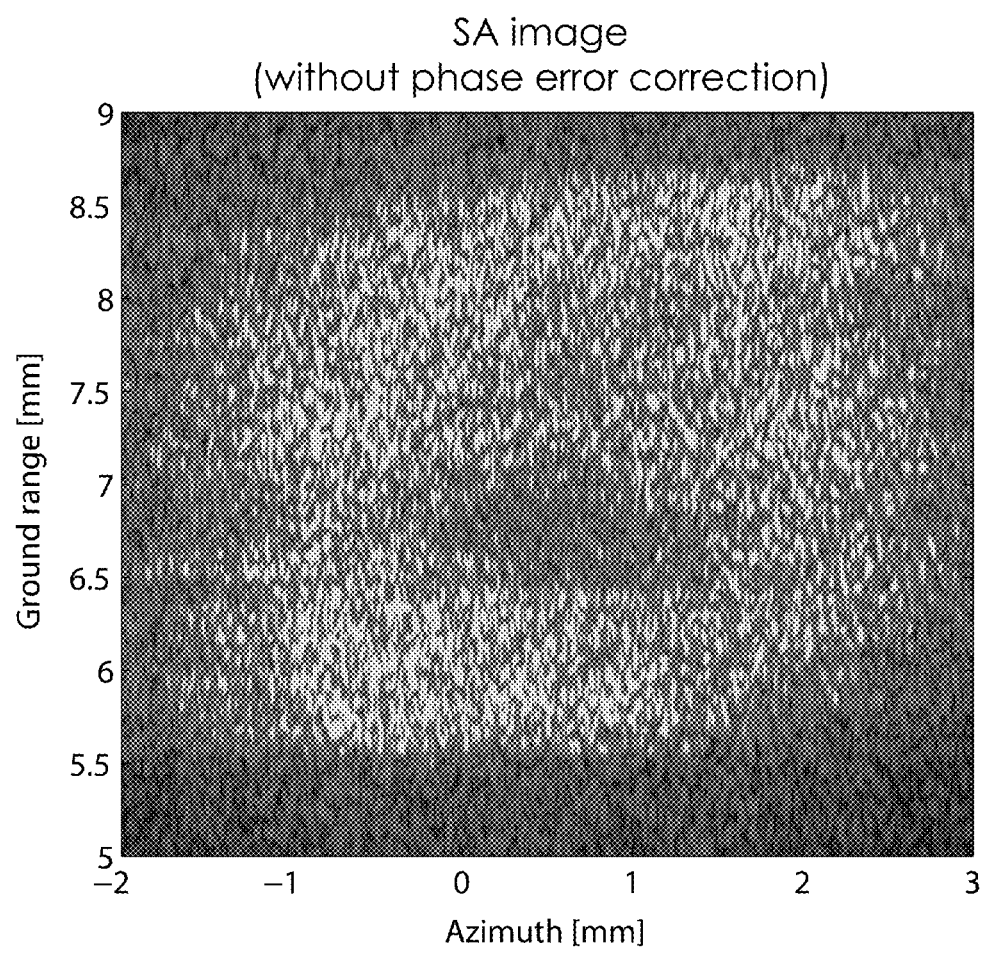
FIG. 8B is a SAL image of the target reconstructed without applying phase error correction.
Figure 8C:
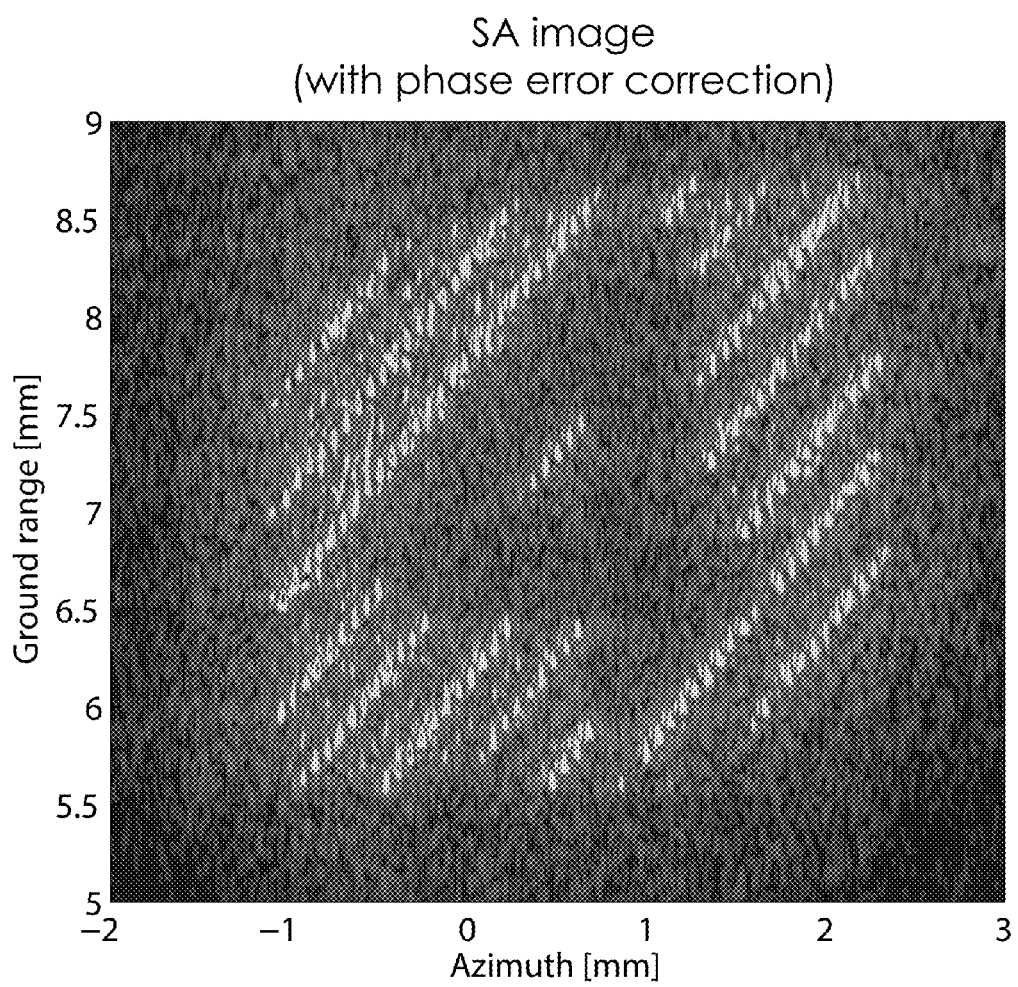
FIG. 8C is a SAL image of the target which was corrected for phase errors using an implementation of the method described herein.

Referring now to FIGS. 8A to 8C, a laboratory-scaled experimental demonstration was conducted to illustrate the capabilities of the phase error correction method described herein. The experimental demonstration was performed with a home-built system configured for SAL imaging. The target consisted of a retroreflective tape with the number "4" painted thereon. A photograph of the actual target is shown in FIG. 8A. The reference region consisted of a white sheet of paper. Optical fibers for transmitting and receiving optical signals and a collimator for collimating the reference optical signal were mounted on a translation stage disposed 25 centimeters away from the target. The laser output power was 15 milliwatts and the wavelength was continuously linearly swept from 1535 to 1565 nanometers. FIG. 8B is a SAL image of the target reconstructed without phase error correction, while FIG. 8C is a reconstructed SAL image of the target which was corrected for phase errors using the various techniques described herein. It is seen that the phase-corrected image in FIG. 8C is more properly focused and enables distinguishing individual retroreflecting elements of the tape, which is not possible for the image shown in FIG. 8B.

The phase-corrected target SA data thus obtained may then be processed using known SA processing techniques involving, for example, FFT and matched filtering algorithms, or optronic processing to reconstruct an image of the target region in which the impact of phase errors is mitigated. In some embodiments, the phase error correction method described herein allows for the estimation and compensation of the bulk of the phase errors affecting the SA data. If desired or required, in such embodiments, a subsequent correction of residual phase errors could be performed based, for example, on the PGA algorithm, which generally tends to be more efficient when the magnitude of the phase errors is relatively small.

Synthetic Aperture Processing Unit

Referring back to FIG. 4, the SA imaging system 10 includes a SA processing unit 70, which may be embodied by any type of appropriate processing unit capable of processing the SA data collected and stored by the SA acquisition unit 30. In the context of the present specification, the term "processing unit" denotes an entity of the SA imaging system 10 that controls and executes the operations required for correcting phase errors in SA data. For this purpose, the SA processing unit can include a determination module 72 configured to determine the one or more phase correction factors from the reference SA data based on an assumption that the reference region has a known topography, as well as a correction module 74 configured to apply a phase correction to the target SA data based on the one or more phase correction factors so as to obtain phase-corrected target SA data. In some embodiments, the determination module 72 of the SA processing unit 70 may also include a range compression sub-module 76 to perform a range compression on each of the first and second SA data sets $S_1$ and $S_2$ obtained from the SA acquisition unit 30, as described above.

Those skilled in the art will recognize that the SA processing unit 70 may be implemented as a single unit or as a plurality of interconnected processing sub-units, and may be embodied by a microprocessor, a central processing unit (CPU), a microcontroller, or by any other processing resource or any combination of such processing resources configured to operate collectively as a processing unit. Alternatively, the SA processing unit 70 can be implemented as an optronic processor. The SA processing unit 70 can be described as a series of modules, each of which performing one or more different functions, such as the determination module 72, the correction module 74 and the range compression sub-module 76 introduced in the previous paragraph. However, it will be understood that the subdivision into such modules is made from a conceptual standpoint only and that, in practice, a given hardware or software component may be shared by different modules, and that components of different modules may be combined together physically and logically without departing from the scope of the present invention.

Referring still to FIG. 4, in some embodiments, the SA processing unit 70 may be physically located on the same platform 12 as the SA acquisition unit 30. However, it may be envisioned that certain aspects of the determination of the phase correction factors from the SA reference data and certain aspects of the phase correction of the SA target data may be performed remotely, for example from a remote ground-based processing station. In such scenarios, the target and reference SA data acquired and stored by the SA acquisition unit 30 could be transmitted wirelessly to the remote processing station while the platform is moving relative to the scene. Alternatively, the SA data acquired and stored by the SA acquisition unit 30 could be transferred to the SA processing unit 70 via wired or wireless transmission after the SA target and reference data have been acquired and the SA acquisition unit 30 has returned to the ground.

As mentioned above, the phase error correction method may be carried out numerically and/or optronically, and may include processing the target and reference SA data using conventional techniques based on the theory of SA imaging. In this regard, it will be understood by those skilled in the art that various such techniques could be employed, given the many approaches and algorithms available for numerically and/or optronically processing SA data.

Of course, numerous modifications could be made to the embodiments described above without departing from the scope of the present invention.

The invention claimed is:

1. A method for phase error correction in a synthetic aperture (SA) imaging system configured for imaging a target region of a scene from a platform in relative movement with respect to the scene, the SA imaging system comprising an SA acquisition unit on the platform, the SA acquisition unit comprising a target transmitter and a reference transmitter; the method comprising the steps of:
    a) directing a target optical signal onto the target region with the target transmitter and collecting target return echoes produced by reflection of the target optical signal from the target region, thereby acquiring target SA data, and directing a reference optical signal onto a reference region with the reference transmitter and collecting reference return echoes produced by reflection of the reference optical signal from the reference region, thereby acquiring reference SA data;
    b) determining one or more phase correction factors from the reference SA data based on an assumption that the reference region has a known topography, the one or more phase correction factors being representative of uncompensated optical-path-length fluctuations along a round-trip optical path between the reference region and the SA acquisition unit; and c) applying a phase correction to the target SA data based on the one or more phase correction factors so as to obtain phase-corrected target SA data.

2. The method according to claim 1, wherein step a) comprises collecting the target return echoes from the target region as a target reflected signal using a target receiver, and collecting the reference return echoes from the reference region as at least one reference reflected signal using at least one respective reference receiver distinct from the target receiver.

3. The method according to claim 1, wherein step a) further comprises:

obtaining a first SA data set from a first reflected signal collected by a first receiver associated with the target transmitter, the first reflected signal being produced by reflection of the target optical signal from the target region and of the reference optical signal from the reference region;

obtaining a second SA data set from a second reflected signal collected by a second receiver associated with the reference transmitter, the second reflected signal being produced by reflection of the target optical signal from the target region and of the reference optical signal from the reference region, the first and second receivers being spaced from each other on the platform; and extracting a first target SA signal and a first reference SA signal from the first SA data set, and a second target SA signal and a second reference SA signal from the second SA data set, the first and second target SA signals together forming the target SA data, and the first and second reference SA signals together forming the reference SA data.

4. The method according to claim 3, wherein step b) comprises determining first and second phase correction factors, each of which as a function of the first and second reference SA signals, the first phase correction factor accounting for one or more sources of the uncompensated optical-path-length fluctuations that are independent of a spatial arrangement of the reference transmitter, the first receiver and the second receiver on the platform, and the second phase correction factor accounting for one or more sources of the uncompensated optical-path-length fluctuations that depend on the spatial arrangement of the reference transmitter, the first receiver and the second receiver on the platform.

5. The method according to claim 4, wherein step c) comprises applying the phase correction to the first target SA signal based on the first and second phase correction factors and in view of a relative spatial arrangement of the target transmitter and the first receiver on the platform.

6. The method according to claim 3, wherein the extracting comprises performing a range compression on each of the first and second SA data sets.

7. The method according to claim 3, wherein step a) further comprises the preliminary substeps of:
generating a source optical signal; and
splitting the source optical signal into the target optical signal and the reference optical signal.

8. The method according to claim 7, wherein the source optical signal is a pulsed optical signal and wherein generating the source optical signal comprises performing a linear frequency modulation on the source optical signal.

9. The method according to claim 8, wherein obtaining each of the first and second SA data sets comprises performing a quadrature demodulation by mixing the respective one of the first and second reflected signals with a local oscillator signal coherent with the source optical signal or with a delayed version of the source optical signal.

10. The method according to claim 1, further comprising collimating the reference optical signal prior to directing the reference optical signal onto the reference region.

11. A synthetic aperture (SA) imaging system for obtaining a phase error-corrected image of a target region of a scene from a platform in relative movement with respect to the scene, the SA imaging system comprising:

an SA acquisition unit provided on the platform and comprising a target transmitter configured to direct a target optical signal onto the target region and a reference transmitter configured to direct a reference optical signal onto a reference region, the SA acquisition unit being configured to collect target return echoes produced by reflection of the target optical signal from the target region, thereby acquiring target SA data, and to collect reference return echoes produced by reflection of the reference optical signal from the reference region, thereby acquiring reference SA data; and a SA processing unit comprising:

a determination module configured to determine one or more phase correction factors from the reference SA data based on an assumption that the reference region has a known topography, the one or more phase correction factors being representative of uncompensated optical-path-length fluctuations along a round-trip optical path between the reference region and the SA acquisition unit; and a correction module configured to apply a phase correction to the target SA data based on the one or more phase correction factors so as to obtain phase-corrected target SA data.

12. The SA imaging system according to claim 11, wherein the SA acquisition unit comprises:

an optical source for generating a source optical signal;
an optical splitter for splitting the source optical signal into the target optical signal and the reference optical signal;
a first receiver associated with the target transmitter and configured to collect a first reflected signal produced by reflection of the target and reference optical signals from the target and reference regions, respectively;
a second receiver associated with the reference transmitter and configured to collect a second reflected signal produced by reflection of the target and reference optical signals from the target and reference regions, respectively, the first and second receivers being spaced from each other on the platform.

13. The SA imaging system according to claim 12, wherein the optical source is a fiber laser, and wherein the reference transmitter comprises collimating optics for collimating the reference optical signal prior to directing the reference optical signal onto the reference region.

14. The SA imaging system according to claim 12, wherein the optical source is a pulsed optical source and wherein the SA acquisition unit further comprises:

an optical modulator configured to perform a linear frequency modulation on the source optical signal; and an optical demodulator configured to perform a quadrature demodulation of the first and second reflected signals and provide therefrom respective first and second SA data sets, the quadrature demodulation comprising mixing each of the first and second reflected signals with a local oscillator signal coherent with the source optical signal or with a delayed version of the source optical signal.

15. The SA imaging system according to claim 14, wherein the determination module is configured to numerically extract a first target SA signal and a first reference SA signal from the first SA data set, and a second target SA signal and a second reference SA signal from the second SA data set, the first and second target SA signals together defining the target SA data, and the first and second reference SA signals together defining the reference SA data.

16. The SA imaging system according to claim 15, wherein the determination module is configured to determine first and second phase correction factors, each of which as a function of the first and second reference SA signals, the first phase correction factor accounting for one or more sources of the uncompensated optical-path-length fluctuations that are independent of a spatial arrangement of the reference transmitter, the first receiver and the second receiver on the platform, and the second phase correction factor accounting for one or more sources of the uncompensated optical-path-length fluctuations that depend on the spatial arrangement of the reference transmitter, the first receiver and the second receiver on the platform.

17. The SA imaging system according to claim 16, wherein the correction module is configured to apply the phase correction to the first target SA signal based on the first and second phase correction factors and in view of a relative spatial arrangement of the target transmitter and the first receiver on the platform.

18. The SA imaging system according to claim 11, wherein the SA acquisition unit comprises a target receiver configured to collect the target return echoes from the target region as a target reflected signal, and at least one reference receiver distinct from the target receiver and configured to collect the reference return echoes from the reference region as at least one respective reference reflected signal.

* * * * *